May 20, 1969          L. J. WITTMAN          3,445,266
PRODUCTION OF DECORATED, POLYTETRAFLUOROETHYLENE
COATED GLASS COOKING VESSEL
Filed Oct. 5, 1965                                    Sheet 1 of 2
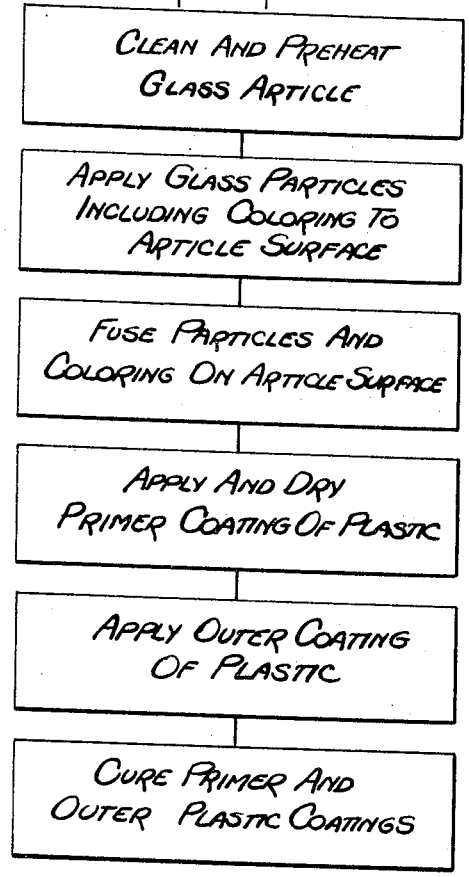
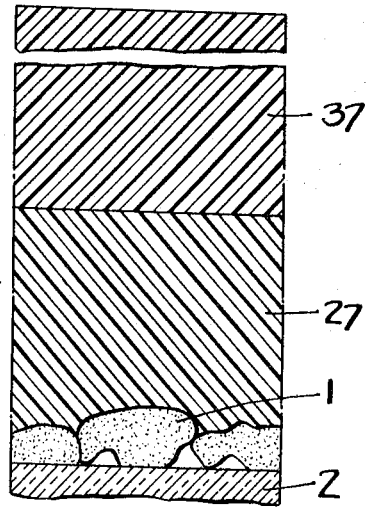
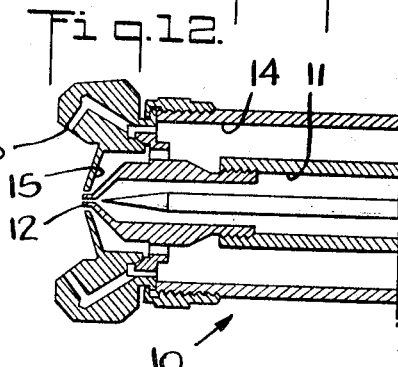
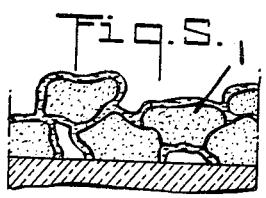
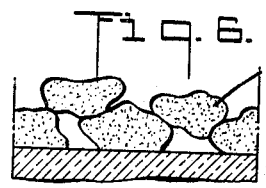
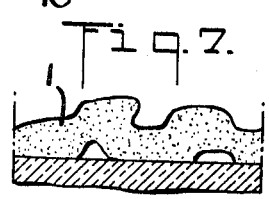
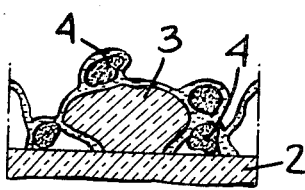
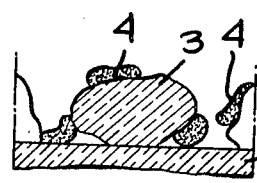
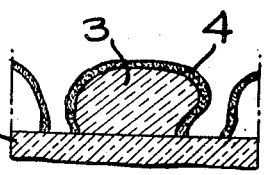
INVENTOR.
LEWIS J. WITTMAN
BY
ATTORNEY

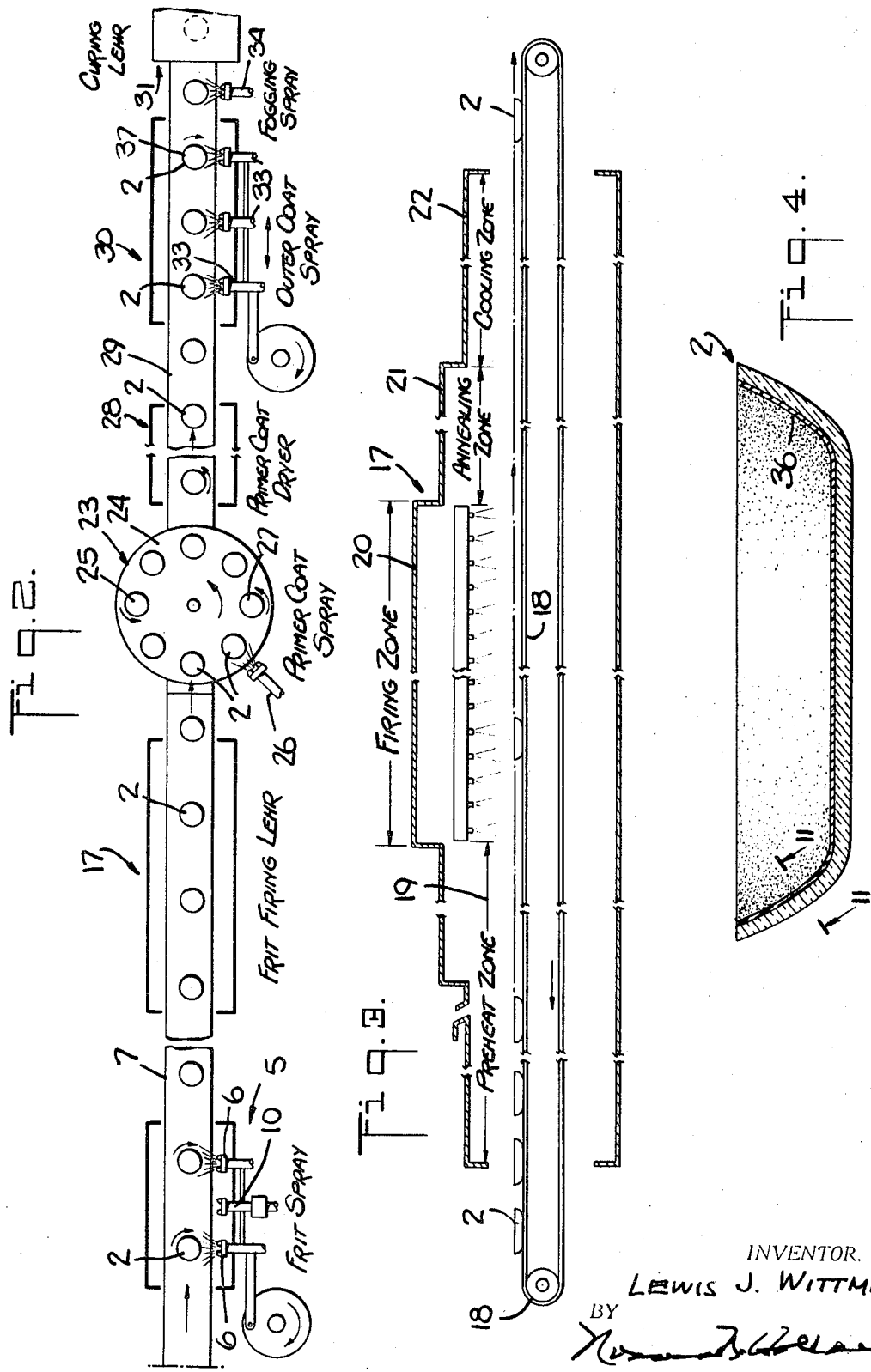

United States Patent Office 3,445,266
Patented May 20, 1969

3,445,266
PRODUCTION OF DECORATED, POLYTETRAFLU-
OROETHYLENE COATED GLASS COOKING
VESSEL
Lewis J. Wittman, Lancaster, Ohio, assignor to Anchor
Hocking Corporation, Lancaster, Ohio, a corporation of Delaware
Filed Oct. 5, 1965, Ser. No. 493,045
Int. Cl. C03c 17/26
U.S. Cl. 117—70                                    5 Claims

ABSTRACT OF THE DISCLOSURE

A method of simultaneously decorating and applying a plastic coating such as Teflon to a glass surface of a transparent or translucent cooking dish or other glass article. Small colored glass particles are first applied to the glass surface and these are partially fused to form a rough surface. In place of colored frit, a mixture of colored enamel particles and plain frit may be used. The plastic coating is applied to the rough frit decorated surface as a liquid and is hardened in place.

---

The present invention relates to coating glass and more particularly to a novel method and means for manufacturing and decorating articles of glassware having a plastic coating bonded to surfaces of the glassware.

A recent development in the manufacture of cookware has applied a nonstick material to the cooking surfaces to eliminate the tendency of the cooked food to stick to the surfaces of the cookware. Such nonstick surfaces have been applied to both translucent and transparent glass cookware by applying a coating of a material such as Teflon to the cooking surfaces of such articles. An improved method of applying Teflon to glass articles, for example, is described in United States patent application Ser. No. 296,625, filed July 22, 1963, now Patent No. 3,372,053, dated Mar. 5, 1968 and owned by the assignee of the present invention.

The present invention relates to further improvements in a method and means of manufacturing such coated glass articles and it includes in particular a method and means for simultaneously decorating the articles to provide a wear-resistant and attractive decoration by which the outer uncoated surface of the glass is decorated in any of a variety of colors.

The new decorating method is characterized by an application of the coloring during an intermediate step in the manufacture of the coated articles. The method is particularly effective and easily performed as the decorating step is readily incorporated into a basic coating operation without requiring extensive changes in the method or addition to the apparatus used during the coating operation.

Accordingly, an object of the present invention is to provide an improved method of coating glass.

Another object of the present invention is to provide an improved method and means for coloring or decorating plastic coated glassware.

Another object of the present invention is to provide a method and means for simultaneously adhering a plastic coating to and coloring glassware.

Another object of the present invention is to provide an improved coated and decorated glass article.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a flow sheet or chart illustrating a preferred embodiment of the method in accordance with the present invention;

FIG. 2 is a diagrammatic plan view of a preferred embodiment of the coating and decorating means;

FIG. 3 is a diagrammatic elevational view illustrating one embodiment of a furnace or lehr for performing the method of the present invention;

FIG. 4 is a vertical sectional view of a coated and decorated glassware article;

FIGS. 5 through 10 are fragmentary cross-sectional figures greatly enlarged illustrating the steps in preferred embodiments of the coating and decorating method;

FIG. 11 is an enlarged sectional view of a wall of a utensil taken along line 11—11 on FIG. 4; and FIG. 12 is a vertical sectional view of a preferred embodiment of the spraying nozzle.

The present invention will be described in connection with the coating and decoration of a glass article such as a baking dish as formed from a glass melt of the type having an extremely low coefficient of expansion which makes it particularly suitable for cooking or baking.

In a preferred method of applying a plastic coating such as a Teflon coating to the glass surface to provide a nonstick surface, the dish or ware is first formed in the usual way by pressing or molding.

After being molded the ware has its inner or cooking surface cleaned to remove any dust or any other residue. Where it may have been subjected to oil or grease in the atmosphere, any such deposits are removed by suitable solvents.

In the next step a coating of tiny glass particles known in the trade as frit is applied to the cleaned surface and where a decorative coloring is desired a coloring agent is incorporated in the frit. This may be done by using a colored glass frit itself or by including particles of a coloring material uniformly mixed with the particles of the frit. This may be done, for example, by mixing a ceramic coloring powder with the glass frit or glass powder so that a substantially uniform mixture of glass particles and frit results. This mixture is then applied to the glass surface using an air gun suitable for spraying such a powder mixed or coated with a liquid binder such as a water-alcohol mixture or an oily binder.

The proportions of the binder and powder are not critical with sufficient binder being used with the powder to cause the powder to remain in position on the glass surface after it is sprayed against the glass surface.

FIG. 5 illustrates an enlarged cross-sectional view of colored frit particles 1 applied to the glassware 2 where the frit itself has a generally uniform coloring. This frit 1 is chosen to have a coefficient of expansion substantially equal to that of the glass of the ware 2. Where the coefficient of expansion of the frit 1 differs from that of the glass it preferably is made somewhat less of that of the glass so that the frit coating is placed under compression rather than tension when the coated article is subsequently heated.

As illustrated, the frit 1 is preferably applied uniformly over the surface to be coated with a slight overlap to the particles or as illustrated in FIG. 8 with the particles 3 in close proximity. While the size of the frit particles is not believed to be critical, best results are obtained by using a frit size with a range between 100 and 250 mesh. A range of frit sizes between these limits appears to give improved adhesion for a better physical connection for the plastic coating. The larger particles contribute to the physical interlock while the smaller particles tend to give an overall smoother surface for the nonstick plastic coating.

FIG. 8 illustrates the frit 3 applied to the glassware 2 where the color is imparted by the addition of particles 4 coloring which may be particles of conventional ceramic coloring. These particles 4 are preferably of somewhat smaller size than the frit to facilitate their being uniformly distributed within the frit coating and to facilitate their subsequent fusing and flow during the fusing operation of the frit which will be described below.

The fusing of the ceramic coloring particles 4 causes them to spread over larger areas of the frit as indicated in FIG. 10 to thereby provide a source of coloring visible from the uncoated surface of the glassware and to provide a novel decorating effect.

FIG. 2 illustrates a frit spraying station at 5. In the preferred embodiment shown, the ware 2 is moved past spray nozzles 6 on a suitable moving conveyor 7. A generally circular article of glassware 2 as illustrated in FIG. 2 is preferably mounted on a rotating spool on the conveyor 7 to expose the interior cooking surface to the sprayed frit 1. To provide a satisfactory spraying interval for the moving ware 2, the spray nozzles 6 are preferably movably mounted and driven so that during the spraying interval they are moved in synchronism with the moving conveyor 7 for a short distance and so that they return thereafter to their initial start position to meet the next piece of ware 2. The number of nozzles 6 used depends upon the size and surface angle of the articles being sprayed. One or two nozzles 6 have been found satisfactory for bowls or other generally circular dishlike articles whereas an additional nozzle is preferable where more rectangular or larger articles are being coated. In such a case, the third or center nozzle 10 is used with all three nozzles having the above described tracking movement so that they move at the conveyor speed during the spraying period.

FIG. 12 illustrates a preferred form of the spray nozzles 6 or 10 in which the frit and liquid binder are fed through the center conduit 11 and outlet 12 at a relatively low pressure such as 2 or 3 p.s.i. while air is supplied at a relatively higher pressure such as, for example, 60 p.s.i. through the outer nozzle conduit 14 and atomizing outlets 15 and spray shaping outlet 16.

The spray nozzles or guns 6 and 10 preferably are aligned to discharge the frit spray at an angle to the surface of the glassware to which the frit is being applied.

FIG. 3 illustrates diagrammatically a firing lehr 17 through which the ware 2 is passed in order to fuse the frit and to securely bond it to the glass surface. The lehr 17 may be of conventional form with the lengths of the sections and the temperatures and conveyor 18 speeds adjusted in accordance with the following criteria.

An initial preheating zone 19 is provided where the temperature of the zone is adjusted to raise the temperature of the moving ware 2 into a range from 300 to 600° F. which is sufficient to remove the binder vehicle including an organic binder where it has been used to bind the frit temporarily onto the article surface. FIG. 6 shows the frit 1 as it leaves the pre-heating zone with the binder removed and with the frit ready for the subsequent fusing steps.

FIG. 9 illustrates the preheating step for frit 3 where the colors are being supplied by separate particle 4 of ceramic coloring. As seen in FIG. 9, the preheating has removed all of the liquid or oily frit binder and the color particles 4 may or may not have been fused depending upon the melting point of the particular coloring particles employed. The color particles 4 illustrated in FIG. 9, for example, are shown as ceramic coloring particles having a melting temperature of about 1000° F., i.e., a few hundred degrees below the fusing temperature of the frit or glassware and such particles will be fused principally in the subsequent frit firing stage in the lehr 17 so that they melt and flow to cover extended areas over the fused frit 3 itself as will now be described.

After leaving the preheating zone 19, the ware 2 passes through a firing zone 20 in which the temperature and time are adjusted to bring the frit itself to its fusing temperature, the exact temperature depending on the frit being used. For high-temperature resistant glassware of the borosilicate type this may be about 1300° F. for the frit so that the ambient temperature within the firing zone 20 is adjusted to about 1400° F. This temperature will also bring the surface of the ware 2 at or near its fusing point to facilitate the fusing or welding of the frit particles 1 or 3 to the article surface. The coloring particles 4 being of smaller size than the frit and being brought above their melting temperature will melt and flow as seen at 4 in FIG. 10 to provide a coloring film which may be continuous or which may cover a substantial area so that it provides a uniform coloring effect when viewed through the opposite side of the ware 2.

The ware 2 after the fusing operation then passes into a conditioning or annealing zone 21 where the temperature is reduced slowly to about 700° F., i.e., a temperature below the strain point in a conventional annealing pattern. Finally, the ware 2 passes into a cooling zone 22 where the temperature is permitted to fall to whatever handling temperature is desired to permit the frit coated ware to be passed to the coating apparatus for the application of the nonstick surface. This temperature may conveniently be between room temperature and about 100° F. or higher.

FIG. 7 illustrates in exaggerated form the fused coating of the frit 1 after it has been fused to the ware 2 and as it would appear in the annealing and cooling stages 21 and 22. In this illustration, a colored frit 1 is shown where the color is uniformly distributed throughout the frit 1.

FIG. 10 illustrates the fused frit 3 where the ceramic color 4 itself has also fused or melted and flowed over areas of the fused frit 3 providing relatively large or continuous areas of color which give an overall colored effect to the ware 2 as the coloring is visible through the uncoated glass surface. The amount of fusing of the coloring particles is not critical and an adequate and pleasing coloring effect is obtained whether the coloring material remains partially unfused or whether it has fused and flowed into a relatively thin colored film as illustrated in FIG. 10. Whatever color fusing or control is used, a consistent color tint and decorative effect are obtained by the exact repetition or duplication of the process steps including the contact of the frit spraying and fusing operation.

The coating and decorating means and process of this invention are applicable to various glasses including the more conventional glass melts such as are used for tumblers and tableware as well as those glasses adapted for higher temperature use such as the borosilicate type glass melts. In addition, the method and means are also useful in coating and decorating the opacified type glasses. These opacified glass products are formed in a series of steps including an initial melt and forming into the desired article shape. Thereafter, the ingredients used in the melt and additional heat treatments result in a glass or ceramic glass with an extremely low coefficient of expansion.

The known heat treatments to produce such glass include an initial heat treating step wherein the formed glass article is brought up to a temperature within a few degrees of the softening point of the glass. This same heating step may be used in accordance with the present invention after the application of the frit particles to the glass surface to partially fuse or melt the frit particles to adhere them to the surface of the glass by heating. In this case, the frit used would be of approximately the same initial composition as the glassware article itself. The initial crystallizing step would thus perform the double function of crystallizing the frit as well as fusing it to the surface of the glass article. Thereafter the additional heat treatments used to complete the opacified glass would be performed as usual. The coloring as well as the plastic or non-stick surface are applied in the same manner as that for the borosilicate or the regular glassware as described herein. The terms such as glass or glassware or glass article as used in this description and the claims thus apply to various types of glass or glassware including the conventional glass melts for glass containers or tableware, etc. as manufactured for normal or lower temperature use as well as to the borosilicate and opacified glasses with the frit application and frit fusing operations being performed in each case in accordance with the criteria described herein and with regard to the particular melting or softening temperatures of the frit used in each case to produce the above described fusing of the frit to the basic glass article.

After the frit particles have been applied as described above, the frit particles assist in attaching or adhering a coating to the surface of the frit coated article. The following coating steps are used regardless of the composition of the glass melt used for the glass article whether it is a conventional melt for glass used at low temperatures or whether it is the borosilicate or the opacified glass for use at higher temperatures.

Where it is desired, for example, to tightly adhere a plastic protective coating for low temperature use, any of the well known plastisols may be sprayed or flowed or otherwise applied over the frit in a coating of predetermined thickness while the plastisol is liquified by a suitable plasticizer. Thereafter, the plastisol coating is cured in the usual way at an elevated temperature and in its hardened state it will be tightly interlocked with the frit particles.

When a heat resistant coating is desired as for cookware, an aqueous dispersion of polytetrafluoroethylene or Teflon may be similarly applied by spraying or by other suitable applicators and the Teflon coating is thereafter cured or hardened by subjecting the coated article to elevated temperatures in the neighborhood of about 750° F. to 800° F. for a period of about 5 to 20 minutes depending upon the nature of the glass article and the coating thickness. The aqueous solutions of the Teflon are mixed with varying water contents depending upon the thickness of the coating desired.

An extremely thin coating, for example, may have abount one part by weight of water to ten parts by weight of Teflon. Thicker coatings may have a mixture of one part by weight of water to five parts by weight of Teflon. In both cases, the mixing and the smoothness of the coating are facilitated by using a suitable wetting agent in the mixture.

The Teflon coating may be advantageously applied in two layers using a less viscous primer coating which will more readily flow in and about the frit particles and by adding a thicker outer protective coating of a more viscous mixture capable of forming a thicker coating.

A suitable Teflon primer coat is distributed by E. I. du Pont de Nemours and Company as Teflon Prime White No. 850—302. This Teflon primer is applied by an atomizing spray to provide for precise depth control. Other means of application can be used such as dipping. The spray is adjusted to form a coating of the desired depth and for cookware articles of conventional shapes and sizes a depth from about .2 to .4 mil has proven desirable. The primer coating is sprayed directly over the frit coated surface so that it flows about and interlocks with the particles of frit.

A preferred mixture for spraying the Teflon primer comprises about 95 parts of primer to 30 parts of an accelerator #VM7799 (distributed by E. I. du Pont de Nemours and Company) and 10 parts of distilled water all by weight.

A preferred embodiment of the primer coating spray means is illustrated at 23 in FIG. 2. The ware 2 with the frit firmly attached to the surface to be coated is mounted on a rotatable table 24 including a series of ware supporting chucks 25 rotatably mounted at the periphery of the table 24. A piece of ware 2 is mounted on each of the chucks 25 with the frit coated surfaces suitably exposed to a spray nozzle 26. The nozzle 26 sprays the above described primer coating 27 onto the ware in a coating of the desired thickness. The nozzle 26 may be of the type illustrated in FIG. 12 where the primer is fed through the center aperture 12 at a relatively low pressure such as 2 to 3 lbs. and where the atomizing air is fed through the outer conduit 14 at a relatively higher pressure. A 60 p.s.i. air pressure has been found satisfactory.

After the primer coat is applied at the preferred depth it is dried prior to its being cured. The drying is accomplished by subjecting the coating to a relatively low temperature of between 200° F. and 500° F. for a time period to complete the evaporation of the water. Times of 1 minute to 20 minutes may be used depending upon the temperature. With a drying temperature of about 450° F. a drying time of 6 minutes is usually adequate. This dries out the water and other solvents so that a bubbling of the solvent and resulting blisters are avoided during the subsequent higher temperature curing operation. Any suitable oven may be used for the drying operation which provides the desired temperature and which provides for exposure of the ware to the heated atmosphere for the time interval provided.

A drying oven 28 is illustrated in FIG. 2 surrounding a conveyor belt 29 having suitable ware supports and adapted for carrying the ware 2 through the primary coat drying oven as well as the outer coat spraying means 30 and the final curing lehr 31.

The dried primer coating may now be cured by being heated in a higher temperature furnace which may be a firing lehr. This lehr has a controlled temperature of about 750° F. to 800° F. and the ware is subject to this temperature for a time period of about 5 to 20 minutes as discussed above to provide for a complete cure of the primer coating.

In the preferred embodiment, however, after the primer coat has been dried an outer Teflon coat is applied over the primer coating prior to the curing of the primer coating. This coating preferably has a greater thickness such as from .6 to .8 mil which provides an overall Teflon coating of primer and outer coating of satisfactory thickness from about .8 to 1.2 mils.

A satisfactory Teflon for the outer coating is Teflon Green #855–114 distributed by E. I. du Pont de Nemours and Company. This coating is applied at the desired depth by an atomizing sprayer as illustrated at 30 in FIG. 2.

A preferred mixture for spraying the Teflon outer coating comprises 100 parts of Teflon Green #855–114 to 10 parts of distilled water both by weight.

The outer coating spray means 30 preferably includes a plurality of atomizing nozzles 33. For cookware of normal size three such nozzles 33 have been found to be satisfactory of the general type as illustrated in FIG. 12 and described above where the Teflon is fed through the central conduit and is atomized and applied to the surfaces of the ware by a spray of atomizing air under relatively high pressure. In order to provide a smooth continuous coating on the moving ware 2, the nozzles 33 are preferably moved in synchronism with the moving ware 2 during the spraying interval.

To insure complete coverage of the ware 2 by the outer coating, an additional stationary final spray nozzle 34 is provided having a wide spray pattern. This stationary nozzle 34 applies a final thin layer as the ware 2 is moved past it and on to the final curing lehr 31.

In the curing lehr 31 the temperature of the sprayed-on Teflon coatings is gradually raised to a drying temperature of between 200° F. to 500° F. to remove the water from the outer coating and thereafter the ware 2 passes into the final curing section in the curing lehr where the primer and outer Teflon coatings are raised to a temperature of about 750° F. to 800° F. for the final curing of both the primer and outer Teflon layers. The time required to cure the layers at this temperature depends upon the article surface and the thickness of the Teflon layers and a complete curing is effected in drying times of between 5 and 20 minutes with the time appropriately adjusted with regard to the surface conditions, the layer thicknesses, and the particular Teflon formulations being used.

FIG. 11 is an exaggerated and enlarged sectional view of the completed ware with the antistick coating and the decoration completed. The antistick coating 36 including the primer layer 27 and the outer layer 37 when formed of Teflon is generally opaque, however, the novel decorative effect results at the opposite surfaces of the translucent or transparent glass from the coloring at the frit layer. The effect of this coloring is to give a tinted or colored effect to the glass itself. By means of the invention, an attractive colored article of cookware or tableware or the like results where the coloring has been simply and inexpensively applied as described and without requiring the coloring of an entire glass melt. By this means, an increased range of tinting or coloring can be obtained. A great flexibility of varying color designs are achieved by the selection of the frit as it is applied to the glassware after the ware itself has been produced rapidly and efficiently in its natural and uncolored state.

Thus it will be seen that an improved glassware coating and decorating or coloring method and means have been provided which are economically employed and where the coloring operation itself is easily integrated into a coating operation with only a minor change in the apparatus required for the coating operation.

I claim:
1. The method of decorating and of firmly attaching coatings of polytetrafluoroethylene to the interior smooth surfaces of translucent glass cooking vessels which comprises the steps of bringing the vessels to a uniform temperature from between room temperature and about 100° F., mixing fusible glass frit particles and smaller fusible colored particles of a color distinctively different from said vessel and said frit particles with a temporary tacky binder selected from the group consisting of an oily binder or an aqueous-alcoholic binder, spraying the frit particles generally uniformly over said surfaces of the vessels with the frit particles spacing being less than about one frit diameter, heating the vessels and frit for driving off the binder and fusing the surfaces only of the frit particles and bringing said surfaces of the vessels to a temperature near its fusing temperature, thereafter lowering the temperature of said vessel and frit surfaces below the strain point for the glass article and the frit particles whereby the particles are adhered to one another and form irregular colored and roughened layers on said surfaces of the vessels, applying an aqueous dispersion of from about five to about ten parts by weight of polytetrafluoroethylene per part of water of sufficient depth to form a first coating covering said frit layers on each of said vessels and hardening said coating at a temperature of from about 750° F. to about 800° F.

2. The method as claimed in claim 1 which further comprises said frit particles having about the same coefficient of expansion as does the glass of the glass vessel.

3. The method as claimed in claim 1 which further comprises said frit particles having a coefficient of expansion slightly lower than that of the glass of said glass vessel.

4. The method as claimed in claim 1 which further comprises said colored particles being fusible at a temperature lower than the fusing temperature of said frit.

5. The method as claimed in claim 1 which further comprises the steps of applying a more viscous liquid dispersion of polytetrafluoroethylene and forming a thicker outer coating, and hardening said outer coating.

References Cited

UNITED STATES PATENTS

| 2,844,557 | 7/1958 | Welch | 117—123 XR |
| 3,070,459 | 12/1962 | Schaffer | 117—124 XR |
| 3,220,870 | 11/1965 | Loehrke. | |
| 3,223,549 | 12/1965 | Fredley et al. | 117—124 XR |

FOREIGN PATENTS

| 1,334,077 | 6/1963 | France. |
| 1,042,012 | 9/1966 | Great Britain. |

ALFRED L. LEAVITT, *Primary Examiner.*

W. F. CYRON, *Assistant Examiner.*

U.S. Cl. X.R.

117—72, 124, 161